March 26, 1935.　　　　E. S. MIX　　　　1,996,025
COLLAR BAR
Filed April 5, 1934
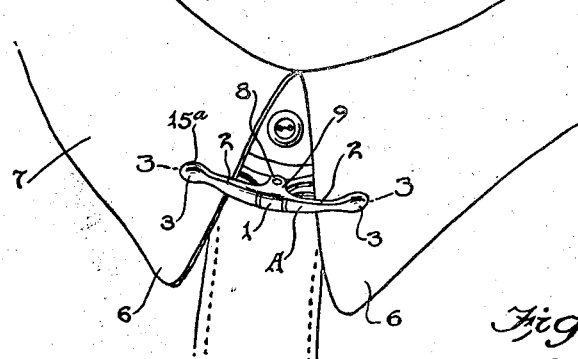
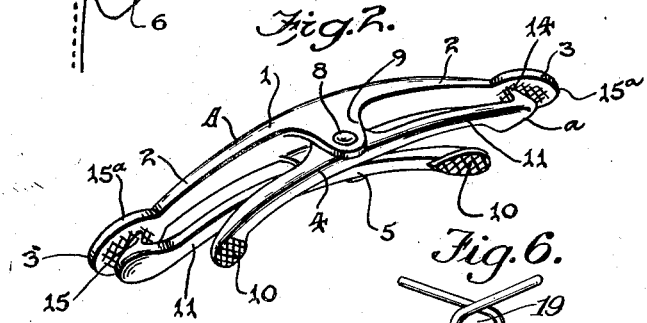
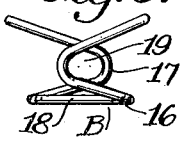
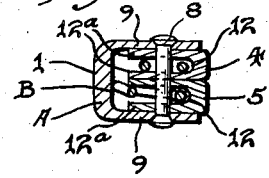
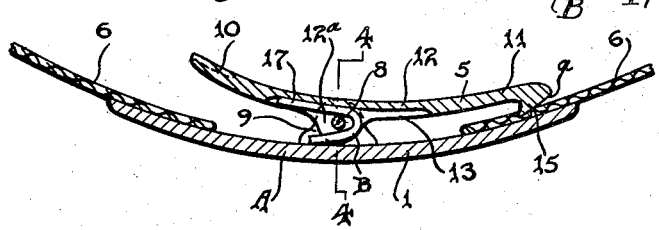
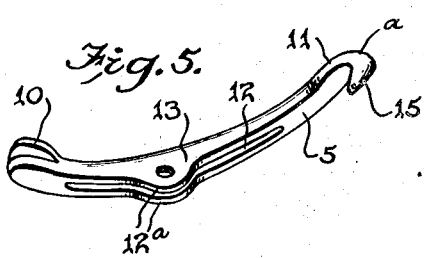
Inventor
Edwin S. Mix,
By
Attorney Patented Mar. 26, 1935

1,996,025

UNITED STATES PATENT OFFICE 1,996,025

COLLAR BAR

Edwin S. Mix, Rochester, N. Y., assignor to Hickok Manufacturing Company, Inc., Rochester, N. Y., a corporation of New York Application April 5, 1934, Serial No. 719,209

11 Claims. (Cl. 24—81)

This invention relates to collar bars.

One object of the invention is to provide an ornamental and attractive collar bar provided with reversely disposed curved levers having clasping portions at their outer ends for clasping cooperation with the bar in a manner as to permit a swiveling of the collar on the wearer without danger of accidental detachment of the bar from the collar and in which the two points of connection of the clasp with the collar may be readily adjusted to regulate the distance desired between the ends of the outer fold of the collar.

Another object of the invention resides in the provision of a collar bar embodying a curved outer member and a pair of reversely curved side by side intersecting or crossing levers easily finger operated and readily applied to or removed from the collar and firmly held in connected clasping relation with the collar without undue wear on the collar.

With these and other objects in vew, the invention consists in the construction and novel combination and arrangement of parts hereinafter described, illustrated in the accompanying drawing, and set forth in the claims hereto appended and illustrated in the accompanying drawing, it being understood that various changes in the form, proportion, and minor details of construction, within the scope of the claims, may be resorted to without departing from the spirit of the invention or sacrificing any of the advantages thereof.

In the drawing:—

Fig. 1 is a perspective view of the invention, illustrating the clasp applied.

Fig. 2 is a rear perspective view of the clasp unapplied.

Fig. 3 is a longitudinal sectional view on the line 3—3 of Fig. 1.

Fig. 4 is a transverse sectional view on the line 4—4 of Fig. 3.

Fig. 5 is a perspective view of one of the operating levers.

Fig. 6 is a side elevation of a particular type of spring employed for urging the clasping levers into cooperative clasping relation with the ends of the bar; and Fig. 7 is an inverted plan view of the spring.

Referring now more particularly to the accompanying drawing, the reference character A indicates a longitudinally curved bar which is concavo-convex in cross-section between its ends and including an intermediate body portion 1 and oppositely extended tapering portions 2 having broadened or spatulate shaped terminal clasping end portions 3. This bar is preferably narrow and the longitudinal side edges thereof merge gracefully into one another to obtain the aforesaid body, tapering portions and spatulate shaped ends to provide for effective ornamentation calculated to appeal to the esthetic senses, and if desired, the bar may have its outer face provided with superficial embellishments or ornamentation, such for instance, as shown in the drawing. This bar 1 may be composed of precious metal or other suitable material.

Clasping levers 4 and 5 cooperate with the bar A to attach the bar to the opposite ends 6 of the outer flaps of a collar 7. These levers are curved and reversely arranged and have a common pivot pin 8 to secure them side by side intermediate their ends between a pair of ears 9 extending from opposite sides of the intermediate body portion 1 of the bar A.

Each of the aforesaid curved levers 4 and 5 consists of an inner operating arm portion 10 and an outer clasping arm portion 11 and each has an inner groove 12 forming spaced flanges 13 from which project spaced perforated ears 12$^a$ which fit between the aforesaid ears 9 of the curved bar A and through which the aforesaid pivot pin 8 passes transversely of the bar and levers to pivotally mount the levers on the bar.

As will be seen in the accompanying drawing, each lever 4 and 5 has its outer clasping end curved and provided at its outer extremity with an inwardly projecting barb 14 and 15, respectively, projecting inwardly substantially upon an incline from the inclined outer end $a$ of the respective lever and having its outer surface rounded or convexed. More specifically, the barbs each consist of a sort of a conical shape having inwardly inclined rounded side faces and an inwardly inclined rounded outer face of greater length than said side faces and a forwardly inclined face, all of said inclined faces leading to a pointed end directed at an inclination from the respective lever toward the inner face of the respective spatulate end of the bar.

The barbs are preferably sharp pointed to cooperate with the roughened inner flat face of the respective spatulate shaped ends of the bar A to firmly grip the ends of the collar, but owing to the slight inclination and the rounded or convexed outer surface of the barbs, they are prevented from piercing the collar directly transversely thereof and yet effectually grip the collar ends without danger of piercing holes in the collar or tearing the collar. The inner faces of the spatulate ends of the bar A need not necessarily be roughened but roughening of such faces tends to facilitate a firm gripping action on the collar as will be understood.

A peculiar type of spring B may be employed, instead of the use of two springs, for normally urging the outer clasping ends of the levers 4 and 5 toward the flat inner faces of the respective spatulate terminal ends of the bar A and to thereby maintain the outer clasping arm portions 11 of the levers normally substantially parallel with the end portions of the bar A with the operating arm portion 10 of one lever arranged at an angle to the other arm of the other lever, the levers intersecting or crossing each other at their pivotal point 8.

The inner faces of the spatulate shaped ends of the bar A are preferably flattened, as at 15ª, to broaden out laterally to provide bearing surfaces for the wearer's thumb or finger to facilitate operation of the levers and these broadened bearing portions 15ª may be roughened, if desired, in any suitable manner to prevent slippage of the wearer's thumb or finger whichever used to operate the levers.

The spring B for urging the levers 4 and 5 normally to closed positions is preferably constructed of a single piece of spring wire and obviates the necessity of two separate springs for the two levers. This single piece of spring wire includes two laterally spaced reversely curved end portions 16 and 17 connected by an intermediate curved spacing portion 18, the spaced reversely curved portions overlapping in spaced relation to form a passage 19 and a mounting through which the aforesaid transversely disposed pivot pin 8 extends with said intermediate connecting portion 18 disposed against the inner face of the bar A and with the terminal ends of the respective reversely curved portions 16 and 17 lying in the longitudinal grooves 12 in the inner side of the respective levers 4 and 5.

This type of spring B and the arrangement thereof with relation to the pivot pin 8 and the levers 4 and 5 provides for an effective spring action throughout the entire length of the spring on the levers. The pin 8 has loose mounting in the passage 19 of the spring, permitting of more or less expansion and contraction of the spring lengthwise incident to the pivotal action of the levers on the spring. The curved connecting portion 18 of the spring has a rocking movement against the inner face of the bar. The result is a movably mounted spring and a consequent easy finger pressure operation of the levers and an effective spring pressed holding of the levers in cooperative clasping relation with the bar. The spring operates by reason of its shape and floating mounting to respond to various lateral strains or movements of the levers on the pivot 8 incident to finger operation of the levers or due to a swivelling action of the wearer's collar on the bar clasped at the two points thereon.

The present collar bar permits natural use of the wearer's fingers of the right and left hands in applying and adjusting the bar and the barbs constructed and arranged as illustrated permits of a certain amount of swiveling and adjustment of the wearer's collar about the two points of connection of the holder to the collar. The ends of the collar can be brought very close together and in the use of flaring tips of the outer flaps of collars, the tips or ends of such flaps can be readily adjusted to the outermost ends of the collar bar.

By reference to roughened portions to effect gripping actions and the reference to serration of such portions is not an intention to limit the invention to mere roughening by means of serrations as protuberances or toothed faces are to be regarded as included under the term or roughened or serrated faces as obviously a cooperating barb like the barbs 14 and 15 might be employed to project from the spatulate shaped ends of the bar A for cooperation with the said barbs of the operating levers 4 and 5. Teeth may be regarded as falling within the idea of roughening the various surfaces.

The views of the collar bar illustrated are somewhat exaggerated as to size and proportions in order to clearly illustrate the invention and it will be understood that the reversely curved levers may be made of sheet metal or any other suitable material and bent to provide the grooves in the backs of the levers or that the levers may be otherwise formed and provided with the rear or back grooves.

It will also be understood that the collar bar is light in weight and permits of quite a natural use of the fingers of the right and left hands in applying and adjusting the holder as well as when removing the holder from connection with the collar. The structure is such as to permit a certain amount of swivelling of the collar on the wearer without danger of the holder becoming accidentally detached therefrom, suitable adjustments being possible and readily made by the wearer, quite a range of adjustments being permitted so that the adjacent end edges of the collar may be brought very close together if desired, or in the use of flared collar ends the ends may be readily adjusted to the outermost ends of the holder.

The roughening of various parts prevents slippage and accidental displacement of the holder with relation to the collar and while I have referred to serrations for roughening gripping purposes, it will be understood that I do not wish to limit the invention necessarily to serrations or roughening of any character or to any particular character of serrations or roughening of the surfaces because equivalent means, such as teeth, protuberances, notches, and even depressions might be employed to prevent slippage and defective gripping actions.

What is claimed is:

1. An article of the character described comprising a bar including an intermediate body portion and tapering end portions having spatulate shaped terminals constituting clasping portions and having spaced ears projecting from said body portion, curved reversely disposed levers pivoted side by side in said ears and each at its outer end having a barb for cooperation with the respective spatulate shaped end clasping terminal of said bar, and a spring movable longitudinally of said bar and said levers on the pivot means of said levers and at the end thereof engaging the levers for urging the outer ends of both of the levers normally in clasping relation with the spatulate shaped end terminals of said bar.

2. An article of the character described comprising a bar including an intermediate body portion and tapering end portions having spatulate shaped terminals constituting transversely enlarged clasping portions having inner flat faces providing substantial bearing surfaces for engagement with a collar and having spaced ears projecting from said body portion, curved reversely disposed levers pivoted side by side in said ears against movement crosswise of said bar and each at its outer end having a barb for cooperation with the inner flat faces of the respective spatulate shaped end clasping terminal of said bar, the inner ends of said levers each having a lateral projection substantially in the plane thereof to provide finger bearing portions of greater width than the width of the levers, and spring means on the pivot means of said levers engaging the latter for urging the outer ends of the levers normally in clasping relation with the spatulate shaped end terminals of said bar.

3. An article of the character described comprising a bar including an intermediate body portion and tapering end portions having spatulate shaped terminals constituting clasping portions and having spaced ears projecting from said body portion, curved reversely disposed levers pivoted side by side in said ears and each at its outer end having a barb for cooperation with the respective spatulate shaped end clasping terminal of said bar, the outer surface of each barb being convexed, and a spring mounted on the pivot means of said levers for movement longitudinally of the bar and at its ends slidably engaging the levers for urging the outer ends of the levers normally in clasping relation with the spatulate shaped end terminals of said bar.

4. An article of the character described comprising a bar having spatulate shaped ends provided with inner flat roughened faces, a pair of similarly formed curved reversely disposed levers pivoted on said bar intermediate the ends thereof, the outer end of each lever having an inclined barb provided with a convex outer surface and adapted to cooperate with the respective flat roughened inner faces of the respective spatulate shaped ends of said bar, and means on the pivoting means and movable, expansible and contractible longitudinally of the bar and engaging the levers to normally urge the barbed outer ends of the levers into cooperative relation with said flat roughened ends of the bar.

5. An article of the character described comprising a bar having integral spaced ears intermediate its ends, a pair of similarly formed curved levers reversely arranged side by side between said ears and each lever having a tapered barb, a pin to pivot said levers in said ears, the back of each lever having a longitudinal groove therein, and a spring having connected spaced portions loosely embracing said pin with the connection between said spaced portions of the spring bearing against the inner face of the bar and the terminals of the spring engaging in the grooves in the back of the respective levers whereby to normally urge the outer ends of the levers into clasping cooperation with the ends of said bar.

6. An article of the character described comprising a bar having spaced integral ears intermediate its ends, a pair of similarly formed curved levers reversely arranged side by side between said ears, a pin to pivot said levers in said ears, the outer ends of said levers terminating adjacent the ends of said bar, the outer end of each lever having a barb directed toward the respective end of the bar, the back of each lever having a longitudinal groove therein, and a spring including oppositely disposed reversely curved portions overlapping in spaced relation at their inner ends and slidable on said pin longitudinally of said bar and having one terminal extending into the back groove of one lever and its other terminal extending into the back groove of the other lever whereby to normally urge the outer ends of the levers into cooperative clasping relation with the ends of the bar.

7. An article of the character described comprising a bar, a pair of similarly formed levers reversely arranged and crossing each other intermediate their ends, each lever at its outer end having a pointed barb, means for pivotally connecting the levers to the bar at their point of intersection including ears and a pivot pin, and a spring formed of a single piece of resilient material and including spaced reversely curved portions extending in spaced overlapping relation longitudinally of the bar and levers and loosely embracing said pivot pin and having oppositely disposed terminals, one terminal engaging one lever and the other terminal engaging the other lever to thereby hold the barbs at the outer ends of the levers normally in clasping relation with said bar.

8. An article of the character described comprising a bar, a pair of similarly formed levers reversely arranged and crossing each other intermediate their ends, means for pivotally connecting the levers to the bar at their point of intersection including ears and a pivot pin, a spring having loose embracing relation with said pivot pin and having oppositely disposed terminals, one terminal engaging one lever and the other terminal engaging the other lever, said spring being expansible and contractible longitudinally of said bar and exerting pressure on said levers to thereby hold the outer ends of the levers normally in clasping relation with said bar, and a barb on the inner face of each lever at the outer end of the latter.

9. An article of the character described, comprising a longitudinally curved bar terminating in transversely enlarged spatulate shaped clasping portions having inner flat faces providing substantial bearing surfaces for engagement with a collar, curved similarly formed reversely arranged levers pivoted on the bar intermediate the ends thereof, each lever including an outer clasping arm portion and an inner operating arm portion and each having at its outer end an inclined barb extending inwardly toward the inner flat face of the respective spatulate shaped end of said bar, and means for urging the barbed clasping ends of the levers into cooperative clasping relation with the spatulate shaped ends of said bar with the outer clasping arm portions of the levers spaced from and arranged substantially parallel with the longitudinally curved bar and the operating ends of the levers curved sharply away from the inner face of the longitudinally curved bar and spaced therefrom to a greater degree than the spaced relation between the clasping portions of the levers and the longitudinally curved bar.

10. An article of the character described comprising a bar, curved levers reversely arranged and pivoted on the bar and having their outer ends terminating opposite the ends of the bar, each lever at its outer end having an inclined barb extending inwardly toward the bar, the outer and side surfaces of each barb being rounded, and a single spring which is expansible and contractible lengthwise longitudinally of said bar and levers and which has sliding engagement at its ends with said levers to maintain the barbed outer ends of the levers normally in clasping relation with the ends of said bar.

11. An article of the character described comprising a bar including an intermediate body portion and oppositely disposed alining longitudinally curved tapering portions terminating in spatulate shaped terminals lying in the plane of curvature of said curved tapering portions and constituting transversely enlarged clasping portions extending on opposite sides of the tapering portions and having inner flat faces providing substantial bearing surfaces for engagement with a collar, said bar having spaced ears projecting from said body portion, similarly formed reversely disposed curved levers pivoted side by side in said ears, each lever at its outer end having a barb, and spring means between said ears and operating on said levers to urge the barbed ends of the levers into cooperative clasping relation with the respective spatulate shaped ends of said curved tapering portions of the bar.

EDWIN S. MIX.